US006719127B2

(12) United States Patent
Depaso et al.

(10) Patent No.: US 6,719,127 B2
(45) Date of Patent: Apr. 13, 2004

(54) COMPENSATION FOR SHAFT TWIST IN THE DRIVE SYSTEM OF MODULAR CONVEYOR BELTS

(75) Inventors: Joseph M. Depaso, Gretna, LA (US); John C. Hawkins, Jr., Mandeville, LA (US); R. Scott Dailey, Destrehan, LA (US); Richard M. Klein, Chalmette, LA (US); Paul L. Horton, Metairie, LA (US)

(73) Assignee: The Laitram Corporation, Harahan, LA (US)

( * ) Notice: Subject to any disclaimer, the term of this patent is extended or adjusted under 35 U.S.C. 154(b) by 24 days.

(21) Appl. No.: 10/065,703

(22) Filed: Nov. 12, 2002

(65) Prior Publication Data

US 2003/0089583 A1 May 15, 2003

Related U.S. Application Data

(60) Provisional application No. 60/333,233, filed on Nov. 14, 2001.

(51) Int. Cl.[7] .................................................. B65G 23/06

(52) U.S. Cl. ......................... 198/834; 474/157; 474/164

(58) Field of Search .......................... 198/834; 474/157, 474/164

(56) References Cited

U.S. PATENT DOCUMENTS

| | | | | |
|---|---|---|---|---|
| RE30,341 E | | 7/1980 | Lapeyre | 198/834 |
| 4,858,751 A | | 8/1989 | Hodlewsky | 198/834 |
| 4,865,183 A | | 9/1989 | Hodlewsky | 198/834 |
| 5,074,406 A | | 12/1991 | Gundlach et al. | 198/834 |
| 5,156,263 A | | 10/1992 | Ledet | 198/834 |
| 5,170,883 A | | 12/1992 | Ledet et al. | 198/834 |
| 5,253,748 A | | 10/1993 | Ledet | 198/834 |
| 5,263,575 A | | 11/1993 | Ledet | 198/834 |
| 5,449,063 A | | 9/1995 | Thomas, Sr. | 198/834 |
| 5,469,958 A | * | 11/1995 | Gruettner et al. | 198/834 |
| 5,934,447 A | | 8/1999 | Kanaris | 198/834 |

* cited by examiner

*Primary Examiner*—Joseph E. Valenza
(74) *Attorney, Agent, or Firm*—James T. Cronvich

(57) ABSTRACT

A sprocket drive system for a modular conveyor belt that compensates for drive-shaft twist under load. The drive system includes a plurality of belt drive surfaces spaced apart across the width of the underside of each row of a modular conveyor belt. A drive shaft supports a group of sprockets at spaced-apart locations. Sprocket drive surfaces are spaced apart circumferentially around the peripheries of the sprockets and arranged in rows across the sprocket to engage corresponding belt drive surfaces in the belt rows. The belt is wrapped around the sprockets on the drive shaft. The engagement of the sprocket drive surfaces with the belt drive surfaces drives the belt. Either the sprocket drive surfaces or the belt drive surfaces, or both, in each row are arranged in an out-of-phase relationship with each other when the conveyor belt is at no load. Once the conveyor belt is operating at load and the shaft twists, the drive surfaces assume an in-phase relationship for improved belt driving and tracking.

20 Claims, 7 Drawing Sheets

54
58
56
52
59
TOWARD
DRIVE
END

TOWARD DRIVE END
36
65'
66
26

36
65
66
26
66
36
65

TOWARD DRIVE END

TOWARD DRIVE END
α
α
36

67
68
70
α
α
36

TOWARD DRIVE END

COMPENSATION FOR SHAFT TWIST IN THE DRIVE SYSTEM OF MODULAR CONVEYOR BELTS

CROSS REFERENCE TO RELATED APPLICATIONS

This application claims the priority of U.S. Provisional Patent Application No. 60/333,233, filed on Nov. 14, 2001.

BACKGROUND OF INVENTION

The invention relates to power-driven conveyors and, more particularly, to sprocket drive systems for modular hinged conveyor belts.

Conventional modular conveyor belts and chains are constructed of modular links, or belt modules, arranged in rows. Spaced-apart hinge eyes extending from each end of the modules include aligned openings. The hinge eyes along one end of a row of modules are interleaved with those of an adjacent row. A pivot rod, or hinge pin, journaled in the aligned openings of end-to-end-connected rows, connects adjacent rows together at hinge joints to form an endless conveyor belt capable of articulating about drive sprockets.

In a typical modular belt conveyor, sprockets are mounted at spaced-apart positions on a drive shaft, which is coupled to a drive motor at one end or both ends of the shaft. Drive shafts are commonly square in cross section or circular with a raised key. Usually all the sprockets are identical with central bores shaped to receive the shaft. Sprocket drive surfaces, such as the leading or trailing edges of sprocket teeth, equally spaced circumferentially around the peripheries of the sprockets, define rows of sprocket drive surfaces aligned parallel to the axis of the drive shaft. The sprocket drive surfaces engage corresponding belt drive surfaces in the underside of the conveyor belt, which, in transition from carryway to returnway, wraps around the drive sprockets. Belt structure in the vicinity of the drive surfaces serves as tracking structure to maintain the belt drive surfaces and the sprocket drive surfaces in correspondence. To keep the belt aligned on the drive shaft and to accommodate variations in belt width with temperature and age, one of the sprockets is typically fixed in position on the shaft and the others are allowed to slide along the shaft. Because the sprockets are identical and the belt drive surfaces are arranged in line across each belt row, the sprocket drive surfaces and the belt drive surfaces are said to be identically timed, or in phase. This means that the drive surfaces on each row (belt or sprocket) define imaginary lines parallel to the axis of the shaft and the width of the conveyor belt. This conventional in-phase sprocket drive system works well in most applications.

In other applications, however, these sprocket drive systems encounter problems. For instance, if the polar moment of inertia of a drive shaft is small, the shaft will twist under a heavy load. One way to increase the polar moment of inertia and to decrease the twist is by using a larger-diameter or otherwise larger cross-sectional drive shaft. But, in many applications, cost, space, or equipment constraints may not allow bigger drive shafts. Twisting of the drive shaft causes the sprocket drive surfaces to get out of phase with each other. Flexible belts are often able to adjust somewhat to out-of-phase sprockets, but stiff belts often cannot. The result is poor or no engagement of sprocket drive surfaces with belt drive surfaces and possible loss of tracking. Continuous poor engagement of drive sprocket with belt accelerates belt failure. This problem is exacerbated in wide belts with long drive shafts in which the total twist and the associated mistiming between sprocket and belt is greater than in narrower belts with short drive shafts.

Thus, there is a need to maintain uniform sprocket drive surface timing at the points of sprocket-to-belt engagement across the width of an entire belt to eliminate the problems caused by the twisting of the drive shaft in sprocket drive systems for modular conveyor belts and to enable the use of smaller, lighter drive shafts.

SUMMARY OF INVENTION

This need and others are satisfied by the invention, which provides a drive system for a modular conveyor belt. The drive system includes a plurality of belt drive surfaces spaced apart across the width of and opening onto the underside of each row of a modular conveyor belt. A drive shaft is supported for rotation with its axis extending in the width direction of the belt. Sprockets are mounted at spaced-apart locations on the drive shaft. Sprocket drive surfaces are spaced circumferentially around the peripheries of the sprockets and arranged in rows across the sprockets to engage corresponding belt drive surfaces in the belt rows. Means for varying the timing relationship among the drive surfaces between an unloaded condition and a loaded condition are associated with either the sprocket drive surfaces or the belt drive surfaces, or both. Thus, the static timing relationship among the drive surfaces along a row is changed to correct the dynamic timing relationship in the presence of shaft twist.

BRIEF DESCRIPTION OF DRAWINGS

These and other features, aspects, and advantages of the invention are described in more detail in the following description, appended claims, and accompanying drawings, in which:

DETAILED DESCRIPTION

Figure 1:
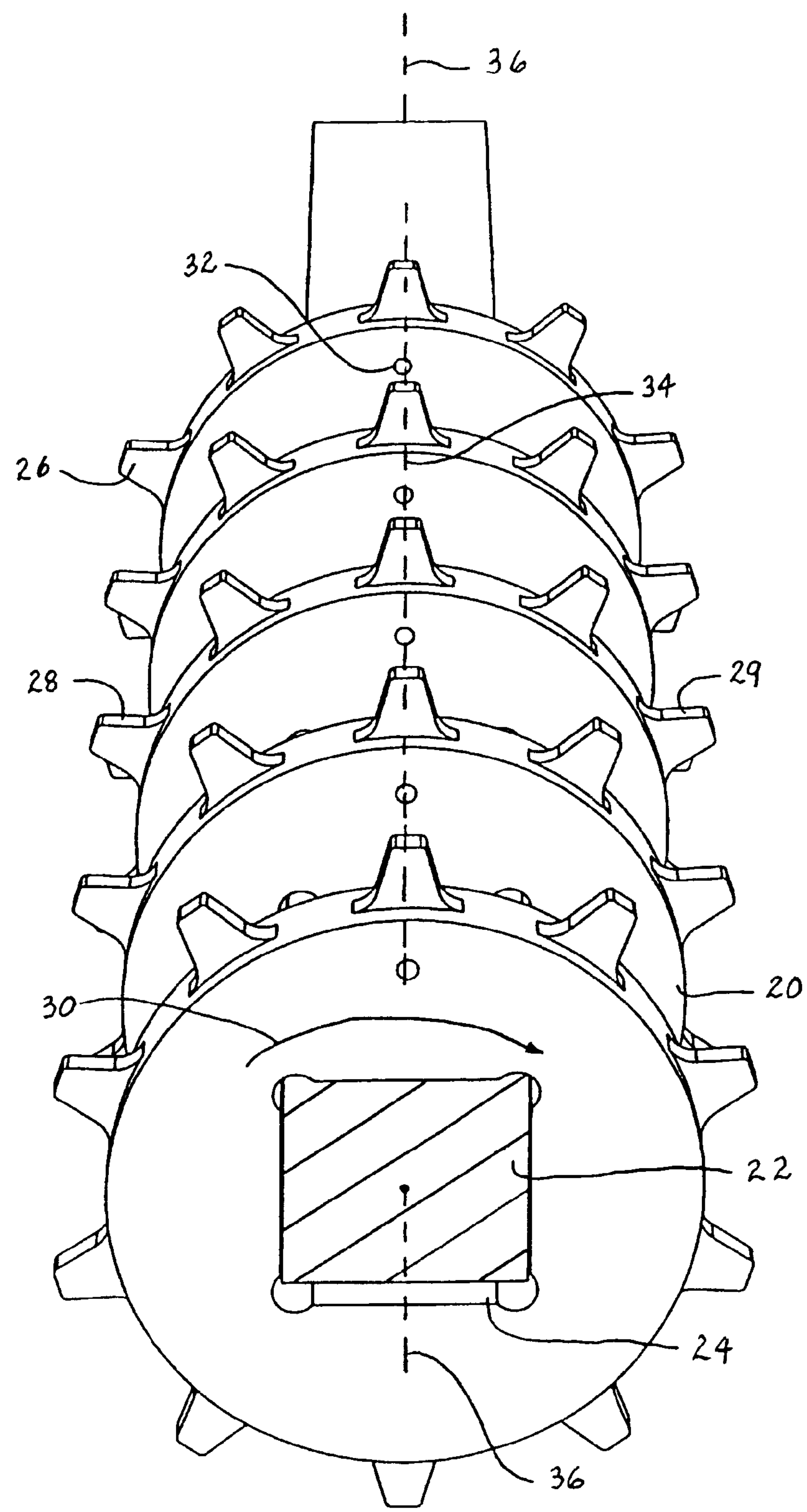
FIG. 1 is a perspective view of a conventional drive shaft with in-phase sprockets in a drive system of the kind capable of being compensated for shaft twist by means embodying features of the invention.
Figure 2:
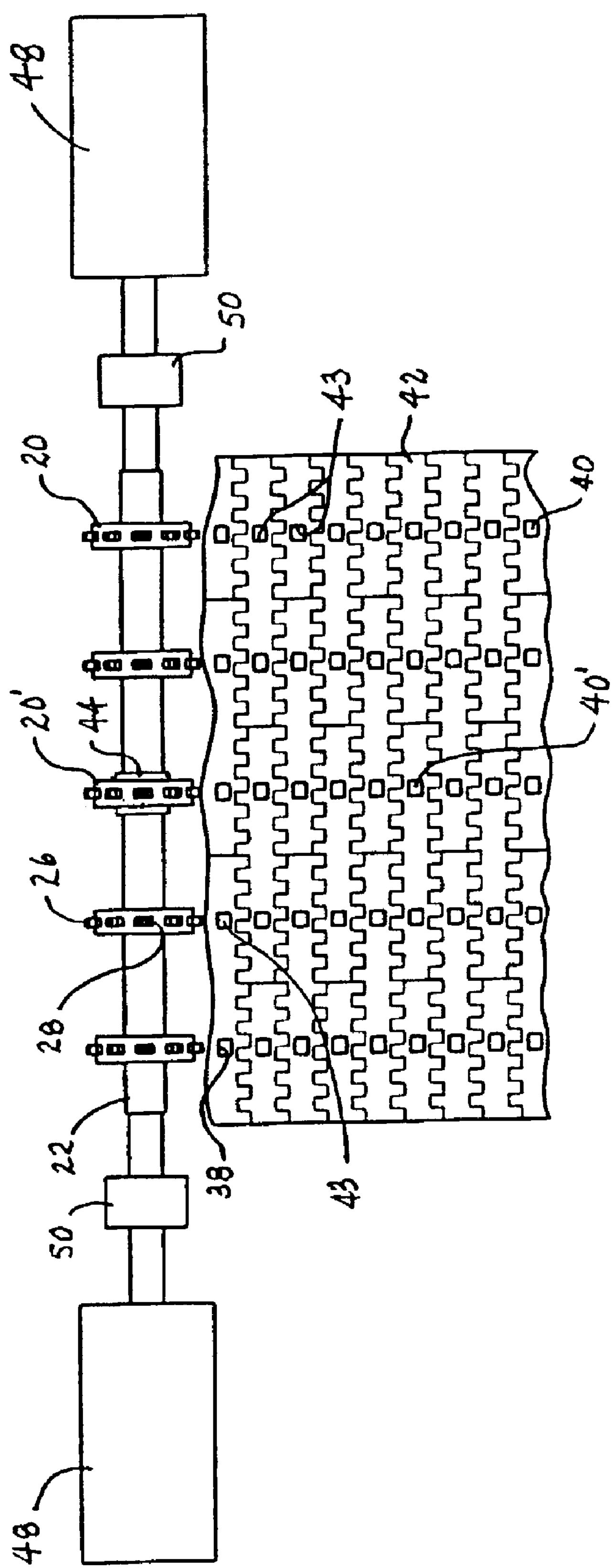
FIG. 2 is a bottom view of a sprocket drive system as in FIG. 1 with drive motors coupled to both ends of the drive shaft.

Typical drive systems for modular conveyor belts to which drive surface phase compensation embodying features of the invention applies are shown in FIGS. 1–3. In FIG. 1, five sprockets 20 are shown mounted at spaced-apart locations on a drive shaft 22 extending through sprocket bores 24. Teeth 26 circumferentially equi-spaced around the peripheries of the sprockets form sprocket drive surfaces, shown as the leading and trailing edges 28, 29 of the teeth. For a sprocket rotated in the direction of curved arrow 30, the leading edges are the sprocket drive surfaces. If the sprocket is driven in the direction opposite to the arrow, the trailing edges 29 become leading edges and act as sprocket drive surfaces.

As indicated by timing marks 32 on each sprocket, all the sprockets shown are timed with their drive surfaces in phase. Corresponding sprocket drive surfaces are aligned to define an imaginary line 34 parallel to the axis 36 of the drive shaft. Because all the sprockets shown in this example are identical, each drive surface of a sprocket is aligned in a row with corresponding drive surfaces of other of the sprockets on the shaft.

Figure 3A:
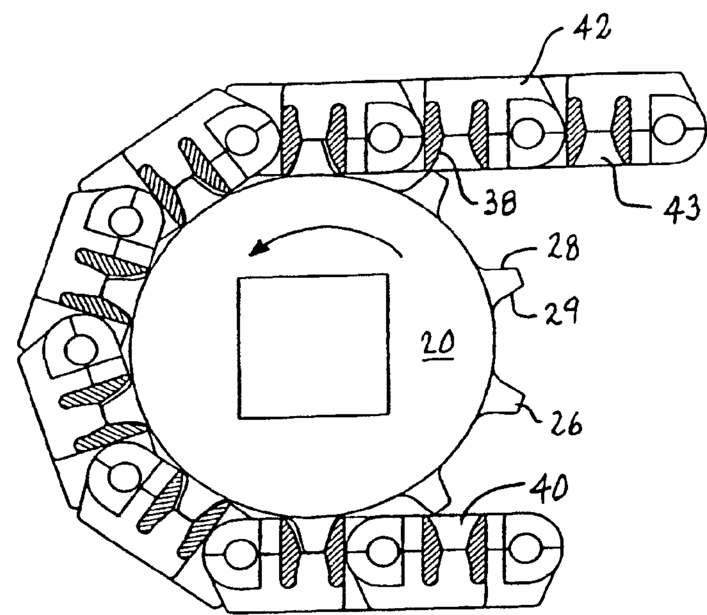
FIG. 3A is a partial cutaway side elevation view of a sprocket drive system as in FIG. 1, in which a sprocket drive surface correctly engages a belt drive surface.

As shown in FIGS. 2 and 3A, the sprocket drive surfaces 28 engage belt drive surfaces 38 forming the leading edges of drive pockets 40 in the underside of a modular conveyor belt 42. (Modular conveyor belts, more particularly modular plastic conveyor belts and associated sprockets, are manufactured and sold by, for example, Intralox, Inc. of Harahan, La., USA.) The middle sprocket 20' is affixed to the shaft by retainer hardware 44 to keep the belt centered in the conveyor frame. The sides 43 of the middle pocket 40' limit lateral wandering of the belt. The other sprockets are allowed to float freely along the shaft and adapt to the thermal expansion and contraction of the belt. In this way the modular belt is positively driven by the sprockets, which track the belt.

Figure 3B:
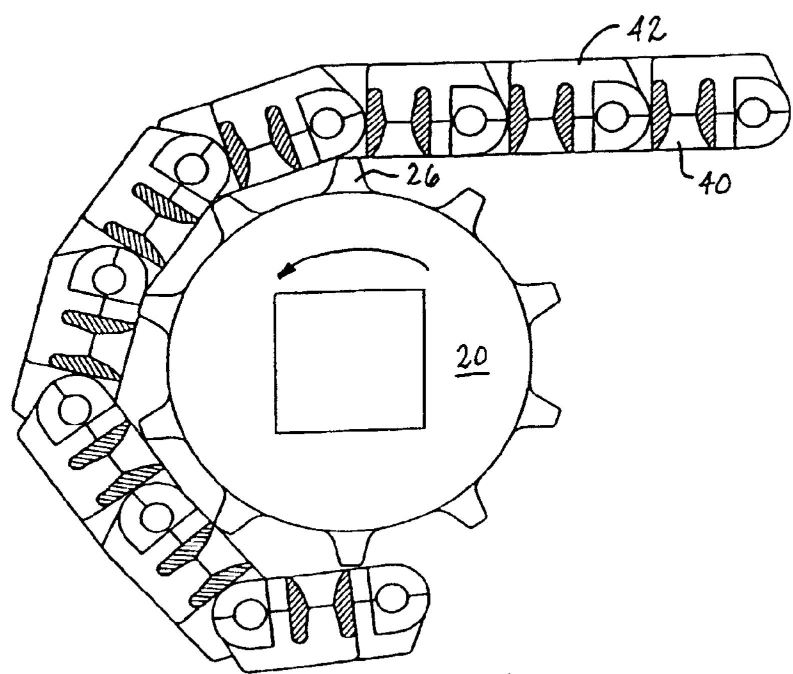
FIG. 3B is a view as in FIG. 3A, in which the sprocket drive surface incorrectly engages a belt drive surface.

The conveyor drive system of FIG. 2 is shown with a pair of drive motors 48 coupled via couplers 50 to the drive shaft 22 at each end. This is common practice in driving wide conveyor belts. For narrow conveyors, a single drive motor at one end of the drive shaft is typical. But it is certainly possible to drive wide belts with a single motor and narrow belts with two motors. As the sprocket drive shaft is loaded, the torque on the shaft causes the shaft to twist. The amount of twist depends on, among other things, the polar moment of inertia of the shaft and the rotational load. The lower the moment of inertia and the greater the load, the greater is the twist for a given shaft material. As an example, a ten-foot-wide belt can have a total shaft twist of a degree or so, with maximum twist gradients of about 0.1° between sprockets spaced about four inches apart. With drive motors at both ends of the shaft as in FIG. 2, the ends of the shaft will lead the middle of the shaft as the twisted shaft rotates about its axis. With a drive motor at only one end of the shaft, that end will lead the rest of the shaft. Because the belt rows remain generally parallel (in-phase), the sprocket drive surfaces away from the driven end or ends of the shaft tend to lag the belt. If a sprocket drive surface 28 lags too much, it will not contact the belt drive surface 38, and the entire sprocket tooth 26 will disengage from the drive pocket 40 and lose track. A correctly engaged belt and sprocket arrangement is shown in FIG. 3A. An out-of-phase belt and sprocket combination, such as at the middle sprocket of an uncompensated dual-motor sprocket drive system as in FIG. 2, is shown in FIG. 3B. Because shaft twist can cause the middle sprockets, i.e., those farthest from the drive ends of the shaft in the dual-drive system shown in FIG. 2, to disengage from the belt drive pockets, the load is borne mostly by the engaged belt modules nearer the side edges of the belt. This tends to overstress those edge modules and accelerate their failure. Clearly, damage to a belt operating in this condition is inevitable.

Figure 4B:
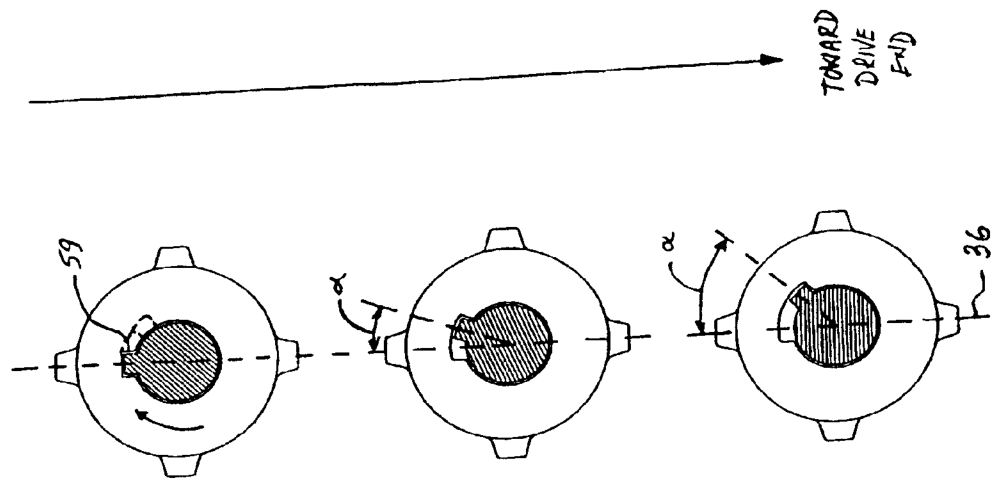
FIG. 4B is a schematic depiction of the drive system of FIG. 4A under load.
Figure 4A:
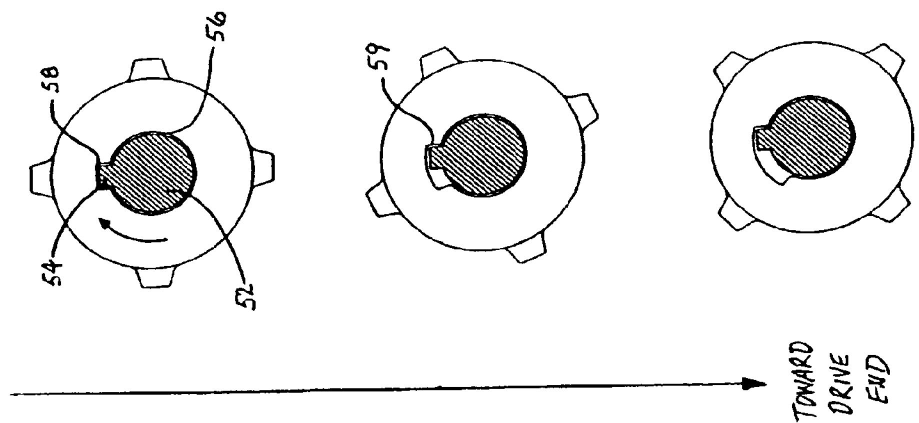
FIG. 4A is a schematic depiction showing, at no load, one version of compensated drive system embodying features of the invention useful especially with round-bore sprockets.

One version of compensated sprocket drive system for a modular conveyor belt is shown in FIGS. 4A and 4B. In this arrangement, shown at no load in FIG. 4A, for a round drive shaft 52 with a raised rectangular key 54, the bores 56 through the sprocket are likewise round with a keyway 58 to accommodate the key. The topmost sprockets in the figures represent the sprocket farthest from the drive end of the shaft, e.g., the middle sprocket in the dual-drive system of FIG. 2. The front edges 59 of the keyways are advanced for sprockets closer to the drive motors at the ends of the shaft and shown exaggerated in FIGS. 4A and 4B. Advancing the front edge of a sprocket's keyway allows the sprocket drive surface 28 to retard by an angle $\alpha$ in its timing relationship to the drive surfaces of other sprockets whose keyway front edges are not so far advanced. In this way, as shown under load in FIG. 4B, the sprocket drive surfaces assume an aligned, in-phase relationship across the twisted drive shaft. Proper tracking and belt drive are maintained in spite of shaft twist by the graduated elongation of the keyways from sprocket to sprocket.

Figure 5C:
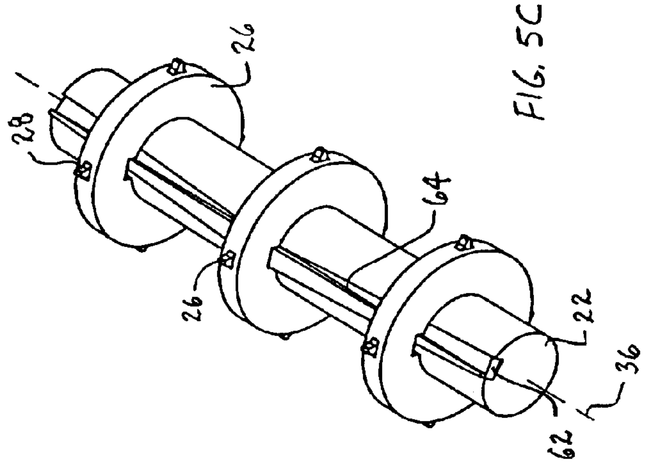
FIG. 5C is an isometric view of FIG. 5B.
Figure 5B:
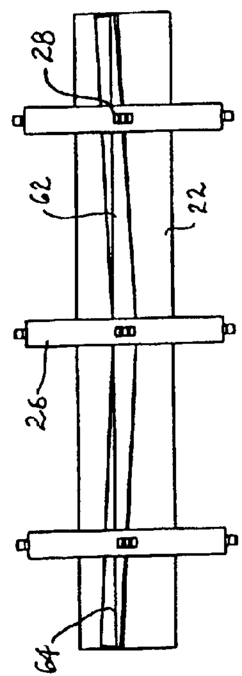
FIG. 5B is a top plan view of the drive system of FIG. 5A under load with sprockets shown.
Figure 5A:
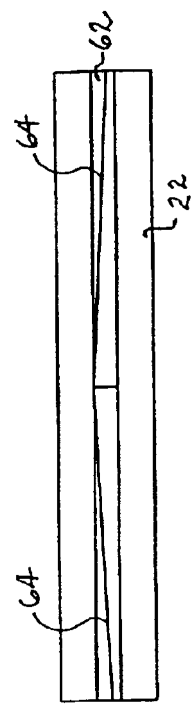
FIG. 5A is a top plan view showing, at no load, another version of compensated drive system embodying features of the invention, in which a tapered key is used on a round shaft.

Another way of achieving similar results is depicted in FIGS. 5A–5C. In this version, instead of selectively lengthened keyways as in FIGS. 4A and 4B, the key 62 is tapered from the middle of the shaft to the drive-coupled ends. The taper is formed, in this example, by machining a tapered edge along one side of a rectangular key. (The taper is exaggerated in FIGS. 4A and 4B for illustrative purposes.) Under no-load conditions, the front edge 64 of the key follows a curved, or non-linear, path, defining, for example, a somewhat U- or V-shaped profile along the shaft. The vertex of the V, at a mid-shaft position, leads the rest of the key through rotation, as shown in FIG. 5A. When the belt operates under load and the shaft twists as depicted in FIGS. 5B and 5C, the front edge of the belt is generally aligned parallel to the axis 36 of the shaft. Because the sprockets in this version are identical, the sprocket drive surfaces 28 are aligned and in phase under load to engage the belt drive surfaces of each belt row evenly. One variation of the tapered key is a stepwise-staggered key in which the key is formed of a series of generally axial key segments laid out along the shaft in a curved pattern. Each segment could accommodate at least one sprocket. Both these versions of timed keys can be used to compensate for shaft twist with standard sprockets and belts.

Figures 6A, 6B:
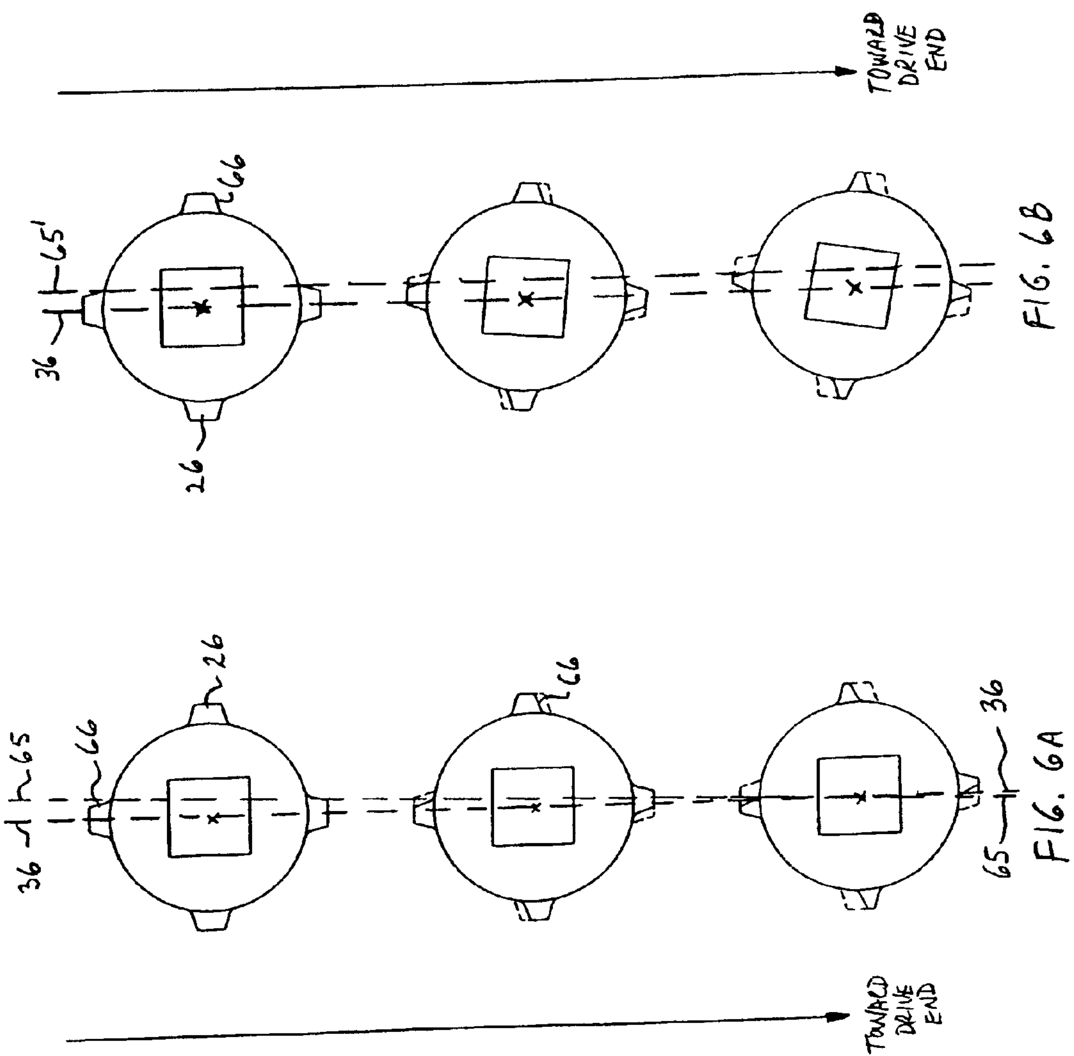
FIG. 6A is a schematic depiction showing, at no load, yet another version of compensated drive system embodying features of the invention and shown with a square-shaft drive system as in FIG. 1.
FIG. 6B is a schematic depiction of the drive system of FIG. 6A under load.

Yet another compensated sprocket drive system is useful with either round- or square-bore sprockets (or, in fact, sprockets of any bore shape). As shown in FIGS. 6A and 6B, the front edges 66 of the sprocket teeth 26 are selectively retarded by, for example, machining them down. In this version, the sprocket drive surfaces nearest the drive end or ends of the shaft are machined back to provide a staggered row 65 of sprocket drive surfaces at no load in FIG. 6A. During loaded belt operation, as the shaft twists, the sprocket drive surfaces are aligned in a row 65' to engage the corresponding row of belt drive surfaces properly. In this example, the sprocket teeth are shown with different circumferential extents from sprocket to sprocket. Depending on the amount of backlash provided by the associated belt drive pocket, it might be necessary to shorten the longer teeth by removing material from their trailing edges. This would increase the backlash and enable the sprocket drive system to tolerate a wider range of loads and associated amounts of shaft twist. Decreasing the extent of the sprocket tooth relative to the belt drive pockets achieves this result, although at the expense of tooth mass and strength.

Figure 7B:
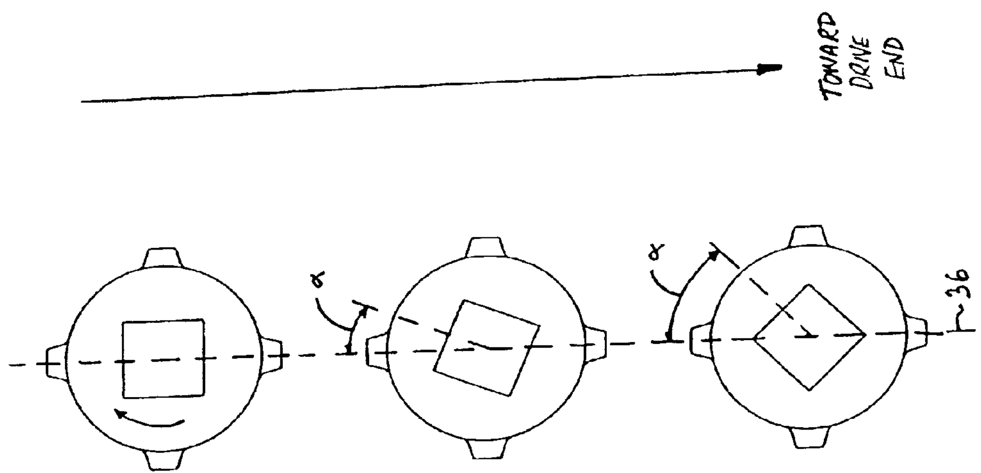
FIG. 7B is a schematic depiction of the drive system of FIG. 7A under load.
Figure 7A:
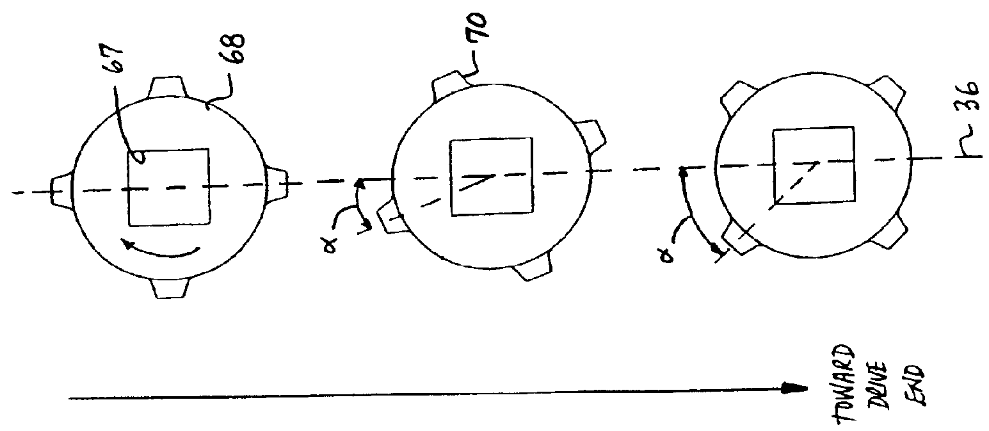
FIG. 7A is a schematic depiction showing, at no load, still another version of compensated drive system embodying features of the invention and shown with a square-shaft drive system as in FIG. 1.

Still another version of compensated sprocket drive system is shown in FIGS. 7A and 7B. In this version, the timing of the sprocket drive surfaces is achieved by adjusting the angular relationship of a bore surface, such as one of the bore walls 67 in the square-bore sprocket 68 or the leading wall of a keyway, to the tooth pattern from sprocket to sprocket. Each of the sprockets of FIGS. 7A and 7B has a different bore-to-tooth angular relationship, exaggeratedly represented by $\alpha$ in the figures. In this way, by changing the registration of the bore to the teeth, the timing of the sprocket drive surfaces 70 can be phased under load by retarding the sprocket drive surfaces nearer the drive ends of the shaft relative to those at the middle.

Thus, the invention provides a sprocket drive system for a modular conveyor belt that compensates for drive shaft twist to allow smaller shafts to be used even with wide, stiff belts in heavily loaded applications. Each of the versions described includes means for varying the timing relationship among the drive surfaces. Tapered keys, elongated keyways, sprocket-tooth extent, and bore-to-tooth angular relationship are examples of the means described in detail for varying the timing relationship among the drive surfaces. The invention further includes methods for modifying existing standard sprockets by machining down the leading and trailing edges of sprocket teeth or by machining keyways to selected lengths—all to adjust the timing of the sprocket drive surfaces from sprocket to sprocket.

Although the invention has been described in detail with respect to preferred versions, other versions, especially versions of the means for varying the timing relationship among the drive surfaces, are possible. For example, it would be possible to adjust the timing of the belt drive surfaces instead of or in addition to the sprocket drive surfaces by changing the lengths or positions of the drive pockets in the belt modules of the row as a function of their positions on the belt, somewhat analogous to shortening the teeth or lengthening the keyway. It should also be recognized that the timing adjustments can be achieved by molding as well as machining. A sprocket having a splined central opening that can receive a hub insert splined on its periphery and with a central shaft bore can be adjusted through a range of timing relationships by selectively orienting the hub before inserting it into the splined opening. Such a two-part-sprocket provides means for varying the timing relationship among drive surfaces by changing the phase angle of the hub insert relative to the toothed portion of the sprocket. Splines are only one example of how this kind of angular adjustment can be made. Another means for varying the timing relationship is through a pre-twisted shaft. At no load, the shaft has a twist to it that untwists at load to put the sprocket drive surfaces in phase. It would also be possible to reduce shaft twist problems by adding a drive at an intermediate location on the shaft that otherwise would lag the most. Yet another way to achieve variable timing across the width of a modular conveyor belt is to add flexibility to portions of the belt. For example, constructing a belt with modules made out of a more flexible material, such as a urethane material or an unfilled polypropylene, nearer the drive gives the belt more play across its width, which allows the belt to conform to the twist of the shaft and the out-of-phase sprockets and thereby to avoid disengagement. Analogously, using a more flexible material for the sprockets near the drive end of the shaft would allow the teeth to deflect more and effectively retard their advancement ahead of the other sprocket drive surfaces. So, as these examples suggest, the compensated sprocket drive system according to the invention is not meant to be limited to the detailed descriptions of the preferred versions.

What is claimed is:

1. A drive system for a modular conveyor belt, the drive system comprising:

a plurality of belt drive surfaces spaced across the width of the underside of each row of a modular conveyor belt;

a drive shaft rotatably supported with an axis extending in the width direction of the belt;

a plurality of sprockets mounted at spaced apart locations along the drive shaft and including sprocket drive surfaces circumferentially spaced around the periphery of each sprocket and arranged in rows from sprocket to sprocket to drivingly engage corresponding belt drive surfaces of the belt rows;

wherein the sprocket drive surfaces define a variable timing sequence with respect to the corresponding belt drive surfaces across the width of the conveyor belt when the belt and the drive shaft are unloaded.

2. A drive system as in claim 1 further comprising a drive motor coupled to the drive shaft at a side of the conveyor belt and wherein the sprocket drive surfaces are relatively advanced in timing across each row with distance along the shaft from the drive motor.

3. A drive system as in claim 1 further comprising a drive motor coupled to the drive shaft at a side of the conveyor belt and wherein the belt drive surfaces are relatively retarded in timing across each row of the conveyor belt with distance from the drive motor.

4. A drive system as in claim 1 wherein the drive shaft has a generally circular cross section with a raised key parallel to the axis and wherein the sprockets form generally circular bores each with a keyway to receive the circular drive shaft and the raised key and wherein the keyways vary in circumferential extent depending on their position on the drive shaft.

5. A drive system as in claim 1 wherein the sprockets include teeth having leading and trailing edges along the periphery of the sprockets, the leading edges forming the sprocket drive surfaces, and wherein the distance between the leading edge and the trailing edge of each tooth of a sprocket depends on the sprocket's position on the drive shaft.

6. A drive system as in claim 1 wherein each of the sprockets includes a central bore having a bore surface registered radially at an angle relative to a sprocket drive surface and wherein the angle of registration for each sprocket depends on the sprocket's position on the shaft.

7. A drive system as in claim 1 wherein the drive shaft has a generally circular cross section with a raised, tapered keyway.

8. A drive system for a modular conveyor belt, the drive system comprising:

a plurality of belt drive surfaces spaced across the width of the underside of each row of a modular conveyor belt;

a drive shaft rotatably supported with an axis extending in the width direction of the belt;

a plurality of sprockets mounted at spaced apart locations along the drive shaft and including sprocket drive surfaces circumferentially spaced around the periphery of each sprocket and arranged in rows of sprocket drive surfaces from sprocket to sprocket to drivingly engage corresponding belt drive surfaces of the belt rows;

wherein the sprocket drive surfaces of each row define a curve in non-parallel relation to the axis of the drive shaft in an unloaded condition.

9. A drive system as in claim 8 wherein the sprockets include teeth having leading and trailing edges along the periphery of the sprockets, the leading edges forming the sprocket drive surfaces, and wherein the distance between the leading edge and the trailing edge of each tooth of a sprocket depends upon the sprocket's position on the drive shaft.

10. A drive system as in claim 8 wherein each of the sprockets includes a central bore having a bore surface oriented at an angle relative to a sprocket drive surface and wherein the angle for each sprocket depends on the sprocket's position on the shaft.

11. A drive system for driving a modular conveyor belt with a twisted shaft, the drive system comprising:

a plurality of belt drive surfaces spaced across the width of the underside of each row of a modular conveyor belt;

a drive shaft rotatably supported with an axis extending in the width direction of the belt;

a plurality of sprockets mounted at spaced apart locations along the drive shaft and including sprocket drive surfaces circumferentially spaced around the periphery of each sprocket and arranged in rows of sprocket drive surfaces from sprocket to sprocket to drivingly engage corresponding belt drive surfaces of the belt rows; and means, associated with at least some of the drive surfaces, for varying the timing relationship among the drive surfaces so that the sprocket drive surfaces engage the belt drive surfaces across the entire width of the belt when the shaft is twisted.

12. A drive system as in claim 11 wherein the means for varying the timing relationship comprises a tapered key formed on the drive shaft.

13. A drive system as in claim 11 wherein the means for varying the timing relationship comprises the angular registration of the sprocket drive surfaces to a bore surface forming a bore wall in a drive-shaft-accommodating bore formed in each sprocket.

14. A drive system as in claim 11 wherein the means for varying the timing relationship comprises sprocket bores formed centrally in the sprockets to accommodate the drive shaft and keyways defining a portion of the bores, wherein the keyways vary in circumferential extent depending on their position on the drive shaft.

15. A drive system as in claim 11 wherein the means for varying the timing relationship comprises sprocket teeth having leading and trailing edges formed on the periphery of the sprockets defining the sprocket drive surfaces and wherein the distance between the leading edge and the trailing edge of each tooth of a sprocket depends on the sprocket's position on the drive shaft.

16. A method of compensating for shaft twist in a modular conveyor system, comprising:

mounting a set of sprockets having sprocket drive surfaces formed on peripheral sprocket teeth on a drive shaft to engage belt drive surfaces in a conveyor belt;

adjusting the timing of the sprocket drive surfaces relative to the belt drive surfaces across the width of the belt.

17. A method of compensating for shaft twist in a modular conveyor system as in claim 16, wherein adjusting the timing comprises:

forming the set of sprockets with the peripheral sprocket teeth varying in circumferential extent from sprocket to sprocket;

arranging the sprockets on the drive shaft with the sprocket having the teeth extending least in circumferential extent mounted closest to a driven end of the drive shaft.

18. A method of compensating for shaft twist in a modular conveyor system as in claim 16, wherein adjusting the timing comprises:

forming the set of sprockets with a central bore having a bore wall whose angular registration relative to the driving surfaces of the teeth varies from sprocket to sprocket;

arranging the sprockets on the drive shaft with the angular registration varying with position along the drive shaft.

19. A method of compensating for shaft twist in a modular conveyor system as in claim 16, wherein adjusting the timing comprises:

forming a key having a tapered edge on the drive shaft;

forming keyways in the sprockets to accommodate the key.

20. A method of compensating for shaft twist in a modular conveyor system as in claim 16, wherein adjusting the timing comprises:

forming the set of sprockets with keyways that vary in circumferential extent from sprocket to sprocket;

forming a rectangular key on the drive shaft;

arranging the sprockets on the drive shaft with the keyways varying in circumferential extent with position from an end of the drive shaft.

* * * * *